US008914672B2

(12) United States Patent
Raasch et al.

(10) Patent No.: US 8,914,672 B2
(45) Date of Patent: Dec. 16, 2014

(54) GENERAL PURPOSE HARDWARE TO REPLACE FAULTY CORE COMPONENTS THAT MAY ALSO PROVIDE ADDITIONAL PROCESSOR FUNCTIONALITY

(75) Inventors: Steven E. Raasch, Shrewsbury, MA (US); Michael D. Powell, Shrewsbury, MA (US); Shubhendu S. Mukherjee, Southborough, MA (US); Arijit Biswas, Holden, MA (US)

(73) Assignee: Intel Corporation, Santa Clara, CA (US)

( * ) Notice: Subject to any disclaimer, the term of this patent is extended or adjusted under 35 U.S.C. 154(b) by 861 days.

(21) Appl. No.: 12/647,940

(22) Filed: Dec. 28, 2009

(65) Prior Publication Data
US 2011/0161630 A1 Jun. 30, 2011

(51) Int. Cl.
| | | |
|---|---|---|
| G06F 11/00 | (2006.01) |
| G06F 9/38 | (2006.01) |
| G06F 11/20 | (2006.01) |
| G06F 9/30 | (2006.01) |

(52) U.S. Cl.
CPC ............ G06F 9/3885 (2013.01); G06F 9/3857 (2013.01); G06F 9/3867 (2013.01); G06F 11/2038 (2013.01); G06F 9/30196 (2013.01); G06F 11/2028 (2013.01); G06F 11/2043 (2013.01); G06F 9/3861 (2013.01); G06F 9/3877 (2013.01)
USPC .......................................................... 714/10

(58) Field of Classification Search
USPC ......................... 714/10, 13; 711/130; 712/205
See application file for complete search history.

(56) References Cited

U.S. PATENT DOCUMENTS

| | | | | |
|---|---|---|---|---|
| 6,542,981 | B1 * | 4/2003 | Zaidi et al. ..................... 712/2 |
| 2001/0034854 | A1 * | 10/2001 | Mukherjee ...................... 714/5 |
| 2003/0120984 | A1 * | 6/2003 | Chuah et al. ................... 714/716 |
| 2004/0015735 | A1 * | 1/2004 | Norman ........................... 714/10 |
| 2004/0153877 | A1 * | 8/2004 | Agarwala ........................ 714/48 |
| 2005/0066060 | A1 * | 3/2005 | Pinkerton et al. .............. 709/249 |
| 2005/0246613 | A1 * | 11/2005 | Blaauw et al. ................. 714/763 |
| 2006/0059286 | A1 * | 3/2006 | Bertone et al. ................. 710/260 |
| 2006/0101307 | A1 * | 5/2006 | Rapp et al. ...................... 714/13 |
| 2007/0011272 | A1 * | 1/2007 | Bakke et al. ................... 709/217 |
| 2008/0270363 | A1 * | 10/2008 | Hunt et al. ........................ 707/3 |
| 2010/0251046 | A1 * | 9/2010 | Mizuno et al. ................. 714/726 |

OTHER PUBLICATIONS

Todd M. Austin, "DIVA: A Dynamic Approach to Microprocessor Verication", Journal of Instruction-Level Parallelism 2 (2000) 1-6, Submitted Feb. 2000; published May 2000.

* cited by examiner

*Primary Examiner* — Yair Leibovich
(74) *Attorney, Agent, or Firm* — Vecchia Patent Agent, LLC

(57) ABSTRACT

An apparatus and method is described herein for replacing faulty core components. General purpose hardware is provided to replace core pipeline components, such as execution units. In the embodiment of execution unit replacement, a proxy unit is provided, such that mapping logic is able to map instruction/operations, which correspond to faulty execution units, to the proxy unit. As a result, the proxy unit is able to receive the operations, send them to general purpose hardware for execution, and subsequently write-back the execution results to a register file; it essentially replaces the defective execution unit allowing a processor with defective units to be sold or continue operation.

21 Claims, 5 Drawing Sheets

GENERAL PURPOSE HARDWARE TO REPLACE FAULTY CORE COMPONENTS THAT MAY ALSO PROVIDE ADDITIONAL PROCESSOR FUNCTIONALITY

FIELD

This invention relates to the field of processors and, in particular, to providing replacement hardware for components of a processor.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores, multiple hardware threads, and multiple logical processors present on individual integrated circuits. A processor or integrated circuit typically comprises a single physical processor die, where the processor die may include any number of cores, hardware threads, or logical processors. The ever increasing number of processing elements—cores, hardware threads, and logical processors—on integrated circuits enables more tasks to be accomplished in parallel. However, as logic and the number of processing elements grow, the susceptibility of processors to hard faults also increases.

As a result, hard faults, such as a bit stuck at a specific level, may threaten yield, performance and reliability of processors. Defects detected at the time of manufacture, potentially result in lost sales; either from reduced yield—scrapping a physical processor—or reducing execution capacity—selling a physical processor with less logic, such as fewer cores. Alternatively, a hard fault may develop over time—a wear out defect—resulting in a potential failure of a part already sold and in operation. Here, the fault or defect may cause the processor to become unstable, may reduce the processor's performance, or may result in the complete failure of the part.

BRIEF DESCRIPTION OF THE DRAWINGS

The present invention is illustrated by way of example and not intended to be limited by the figures of the accompanying drawings.

FIG. 4b illustrates the continued flow diagram from FIG. 4a.

DETAILED DESCRIPTION

In the following description, numerous specific details are set forth such as examples of specific processor units/modules, specific pipeline stages, specific replacement hardware, etc. in order to provide a thorough understanding of the present invention. It will be apparent, however, to one skilled in the art that these specific details need not be employed to practice the present invention. In other instances, well known components or methods, such as specific circuits to form structures, such as pipeline stage circuitry, alternative multi-core and multi-threaded processor architectures, and specific operational details of microprocessors, have not been described in detail in order to avoid unnecessarily obscuring the present invention.

The method and apparatus described herein are for utilizing general purpose hardware to replace defective processor components. Specifically, the replacement of processor components is primarily discussed in regard to general purpose hardware to replace faulty or defective execution units, such as in the embodiments described with regard to FIG. 3. However, the methods and apparatus described herein may be utilized for replacement of any processor component, such as replacement of different pipeline stages, or portions thereof, as described below in regards to FIG. 2.

Figure 1:
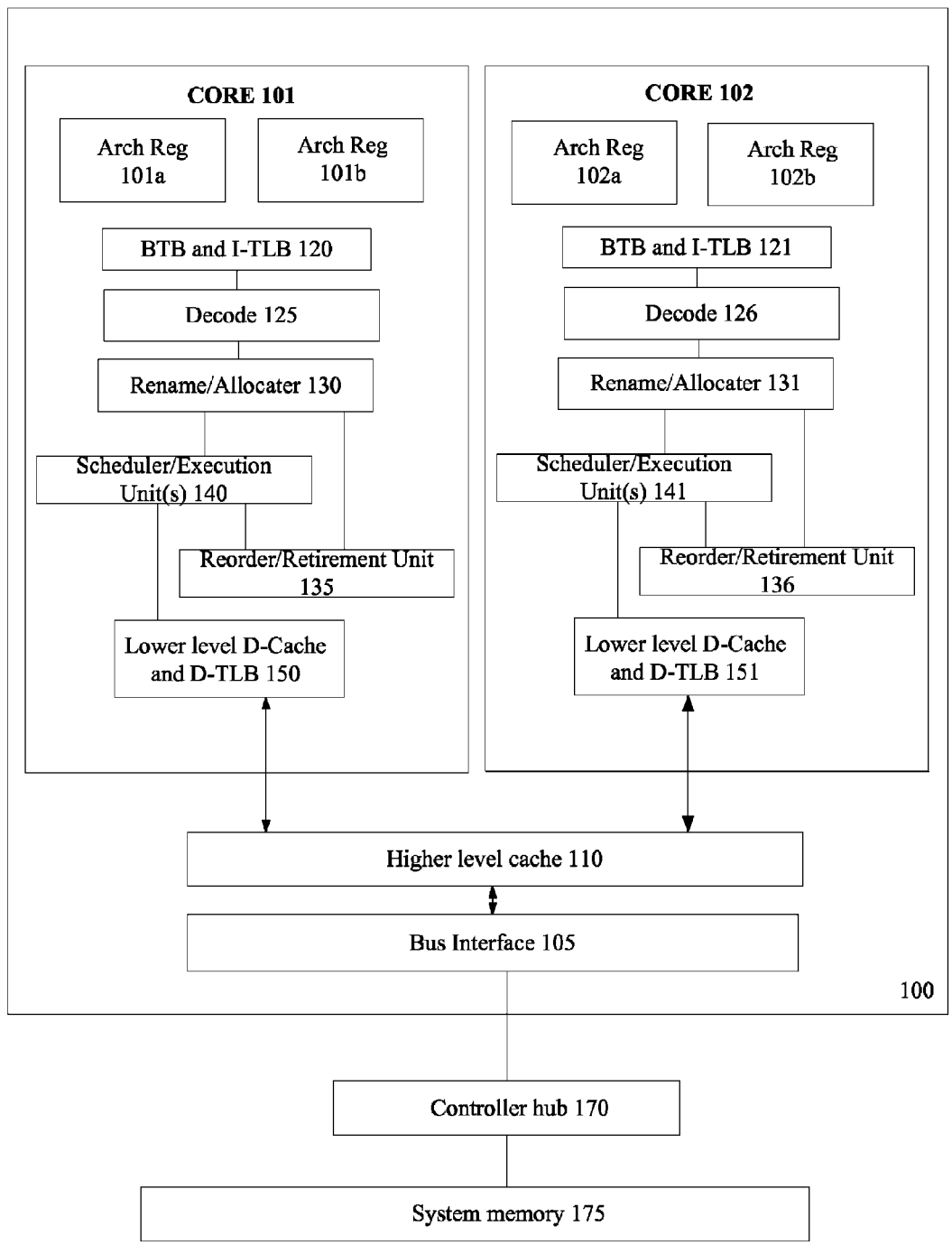
FIG. 1 illustrates an embodiment of a processor including multiple processing elements capable of executing multiple software threads concurrently.

Referring to FIG. 1, an embodiment of a processor capable of executing multiple threads concurrently is illustrated. Although not specifically illustrated, in one embodiment, processor 100 includes replacement hardware capable of replacing one or more components of processor 100. Processor 100 includes any processor, such as a microprocessor, an embedded processor, a digital signal processor (DSP), a network processor, a graphics processor or other device to execute code. Processor 100, as illustrated, includes a plurality of processing elements.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads/slots 101a and 101b, while core 102 includes two hardware threads/slots 102a and 102b. Therefore, software entities, such as an operating system, potentially view processor 100 as four separate processors, i.e. four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101a, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared by, shared through partitioning by, or dedicated to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted.

As illustrated, processor 100 includes bus interface module 105 to communicate with devices external to processor 100, such as system memory 175, controller hub 170, a chipset, a northbridge, or other integrated circuit. In some current microprocessor designs, designers have started to integrate a memory controller on-processor, which may be referred to as an on-processor memory interface unit or uncore unit. As an example, uncore logic may include an interconnect; as well as core, cache, and memory controller components. As a further illustrative example, uncore components are coupled utilizing a ring interconnect. Here, caching agents coupled to the ring are each to manage—handle traffic on the ring interconnect for—an associated slice of a cache(s) for a collocated core. Similarly, core agents/components coupled to the ring are to handle traffic and interface with cores. Additionally, the ring interconnect may include a Memory Peripheral Hub (IMPH) 170 and/or Graphics Hub (GFX) to interface with other modules, such as memory controller (IMC) 170 and a graphics processor (not illustrated), respectively.

Memory 175 may be dedicated to processor 100 or shared with other devices in a system. As depicted, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher-level cache 110 is not so limited, as it may be associated with or include an instruction cache. A trace cache—a type of instruction cache—may instead be coupled after decoder 125 to store recently decoded traces. Module 120, which may be associated with a fetch unit, also potentially includes a branch target buffer to predict branches to be executed/taken and an instruction-translation buffer (I-TLB) to store address translation entries for instructions.

Processor 100 further includes decode module 125 coupled to a fetch unit, which is not specifically illustrated but may be associated with unit 120, as mentioned above. Decode unit 125 is to decode fetched instructions. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed. Therefore, decode unit 125 may include any variety of simple and/or complex instruction decoders to decode instructions that are part of an ISA associated with processor 100.

After decode unit 125, in one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution, and subsequently, in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Although not specifically illustrated, a mapping unit/logic may be included before—associated with allocator 130—or as part of scheduler 140 to perform mapping of instruction(s)/operation(s) to corresponding execution ports/execution units. Additionally, register files associated with execution units 140 are also included to store information from instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are typically held in coherency states to maintain data consistency. The D-TLB is to store recent virtual/linear to physical address translations. As a specific example, a processor may include a page table structure to break physical memory into a plurality of virtual pages.

In one embodiment, processor 100 includes general purpose hardware to replace faulty core components of cores 101 and 102. Examples of general purpose hardware include general programmable logic, such as a Field-Programmable Gate Array (FPGA) device, redundant hardware for components of core 101 and 102, and a replacement core, or portion thereof, to replace components of core 101 and 102.

To demonstrate the versatility of replacement hardware, an illustrative example is discussed. In this example, assume replacement hardware includes: (1) a replacement core (not illustrated but may be symmetric or asymmetric with respect to cores 101, 102) including replicated portions of core 101 or 102; a redundant, simple decoder associated with decode units 125, 126; and an FPGA in processor 100. As a result, when a simple decoder in unit 125 is defective, the redundant decoder may be utilized to replace—decode a simple instruction for—the faulty decoder. And, when an execution unit in module 141 is defective, a replacement execution unit in core may be utilized to execute an operation.

Furthermore, the FPGA may be utilized to replace any of the illustrated components, as well as provide additionally functionality—"shared memory lock management, cryptography functions, support for new instructions not officially recognized as part of the ISA, etc. For example, the general purpose replacement hardware may provide the ability to perform random number generation. Often processors don't include a specific unit to perform random number generation; however, some execution may drastically benefit from hardware capable of performing such an operation. As another example, the hardware may include centralized hardware for lock synchronization. In other words, the hardware may act like a central repository for locks. In yet another example, specific or special instructions that are not part of a specification for an ISA may be supported by the hardware. For example, special random number generator instructions may be supported. Or additional instructions to be added to the ISA, but that are not yet defined, may be first supported by general hardware.

In addition, the general purpose hardware may provide acceleration for on-processor execution. The most common example of an accelerator includes a graphics processor or physics processor to aid the processor in graphics computations. However, this logic is typically located off processor, such as coupled through a memory controller hub to the processor. Yet, acceleration of on-processor execution is not limited to graphics, but may refer to acceleration of any form of execution, such as acceleration of tasks associated with software programs to be executed on processor 100. As a simple example, the general purpose hardware may be utilized to accelerate normal, mundane functions, such as decoding or a type of execution.

Here, decode units 125, 126 may not include decoders that recognize a number of specialized instructions. As a result, general purpose hardware may be capable of decoding and executing the specialized instructions, which essentially adds additional, specialized instructions to an ISA without explicitly providing decoders in normal decode logic. As an example, assume it's desired to add an instruction after a processor is manufactured. In this case, the general purpose hardware, such as an FPGA or firmware with microcode, may be programmed—either during manufacture, at runtime, or as a subsequent update—to decode and execute the additional instruction. Moreover, the general purpose hardware may maintain a repository for lock variables, such that the hardware synchronizes memory access for multiple cores on processor 100.

FIG. 1 illustrates an abstracted, logical view of an exemplary processor with illustrative units/modules. However, the methods and apparatus described herein are not so limited, as they may be implemented in any processor that includes other known units, modules, and/or logic, as well as omits any of the illustrated units. As an illustration, the example above include three types of replacement hardware—redundant components; replacement cores; and programmable, general hardware. Yet, replacement or general purpose hardware may include or omit any combination of these types of hardware, as well as include any other type of known hardware, firmware, or microcode capable of replacing core components.

Figure 2:
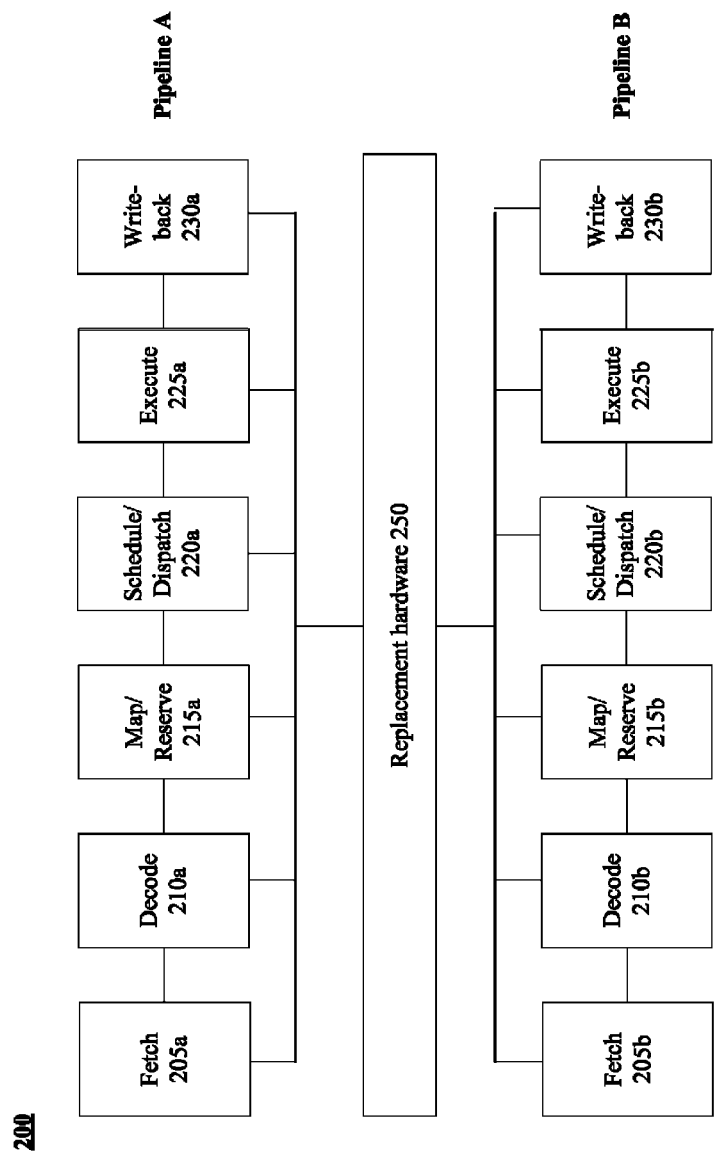
FIG. 2 illustrates an embodiment of replacement hardware for a plurality of pipeline stages.

Turning to FIG. 2, an embodiment of a portion of an over-simplified processor pipeline 200 is depicted. In one embodiment, general purpose hardware, such as hardware 250, is to replace defective, or faulty, components of a core pipeline, such as pipelines A and B. Here, pipeline A is associated with core A, such as core 101 from FIG. 1, on processor 200, while pipeline B is associated with core B, such as core 102, on processor 200. As illustrated, pipelines A and B each include six stages; yet, as mentioned above the depicted pipelines are extremely basic. As a result, a core pipeline may include any number of stages. In fact, some processors have been designed with over twenty stages in the pipeline. Yet, the details of known pipeline design and implementation, as well as the numerous variations of potential pipeline stages, are not discussed in detail to avoid unnecessarily obscuring the pertinent description. Instead, embodiments of general purpose hardware to replace defective components are described in regards to the illustrated, basic stages. And, the described embodiments may then be similarly applied to other known core components and stages, not directly described herein.

As illustrated, basic pipeline's A and B don't specifically include reference to a cache memory "stage." Instead, fetch stage 205, in one example, may obtain instructions or operands from an instruction cache or data cache, respectively. Or write-back stage 230 may include a write-back to a storage structure, such as a register file or to a lower-level cache memory based on the implementation. Therefore, reference to a core pipeline or core pipeline stages, in one embodiment, doesn't include reference to cache memories, which may separately provide their own replacement functionality—cache line replacement, error correction, etc.

To illustrate the operation of basic pipelines A and B, an illustrative example is proffered immediately below. In stages 205a, 205b instructions are fetched. Fetching of an instruction may include any known method of obtaining an instruction. As an example, if the instruction was recently fetched, it's potentially obtained from an instruction cache. Otherwise, if the instruction is not present in the cache, the instruction is obtained from a higher-level memory, such as a shared, system memory. Note that if the processor includes a trace cache to hold recently decoded traces, parts of the fetch and decode process may be elided, since a decoded trace may already exist on the processor in a decoded state.

Next, in stages 210a, 210b the instructions are decoded. In many of today's current processors, a single instruction includes multiple operations, which are often referred to as micro-operations. However, whether the instruction is to perform single or multiple operation(s), decode stages 210a, 210b often include decoders that recognize the instruction as part of a defined set of instructions—an Instruction Set Architecture (ISA)—for processor 200.

In stage 215a, 215b, the instructions are associated with/assigned to resources later in pipelines A, B; respectively. For example, a mapping unit maps the instruction to a port associated with a corresponding execution unit. Current processors typically include multiple different execution units on a single integrated circuit and even within a single core. Therefore, a floating point instruction corresponds to, and is to be executed on, a floating point execution unit (FPU). Similarly, simple integer or logical instructions are to be executed on an arithmetic logic unit (ALU). As stated above, a number of other execution, or functional, units may also be included, such as a load/store execution unit and a jump execution unit.

Once the instructions are mapped to a port for a corresponding execution unit, the instruction is ready to be scheduled on the mapped execution unit and dispatched thereto in stages 220a, 220b. Then, in stages 225a, 225b the instructions, operations, or micro-operations are executed, appropriately. For some instructions, the execution latency—time to execute the instruction—includes a fixed latency—a fixed number of execution cycles. In that instance, the scheduler is able to ensure a slot for write-back of a result from execution of the instruction on a write-back bus to a register file in stages 230a, 230b.

However, some instructions, such as current division and load instructions, are not associated with a fixed execution latency. As a result, scheduler mechanisms are provided to allow access to be reserved after the instruction completes execution. For example, assume an instruction is fetched in fetch stage 205a for core pipeline A; the instruction is decoded in decode stage 210a into a plurality of operations that include a load operation; the load operation is assigned to a port of a load execution unit in mapping stage 215a; the load operation is scheduled on, and subsequently dispatched to, the load execution unit in stage 220a; and the load operation is executed on the load execution unit in stage 225a. Since the load operation has a variable execution latency, a slot on a write-back bus—an interconnect from the execution unit to the register file—is not reserved until execution is complete. Yet, when execution is complete, a slot is reserved on the write-back bus to store the result of the load operation in the register file. As discussed in more detail below in reference to FIGS. 3-4, this on-demand reservation on the write-back bus may be utilized for new instructions supported by replacement hardware or for execution of normal instructions with replacement hardware.

In one embodiment, replacement hardware 250 is capable of replacing the functionality of at least one or more core's pipeline stages. Replacing functionality or performing a task for a pipeline stage as used herein, in one embodiment, refers to a functionality or logic of an entire stage; and in another embodiment, includes replacement of a portion of a stage. In the later case, in stages employing large amounts of logic, such as a decode stage having multiple decoders, a small amount of logic may be defective, such as a single decoder. Here, replacement may refer to replacement of the single, defective decoder within the decode stage and not the entire set of decoders. As another example, assume a single execution unit within an execution stage is defective or a subset portion of a single execution unit is defective. Here, reference to replacement of the execution stage, in one embodiment, refers to only replacement of the single, defective execution unit or the single, subset of the single execution unit, not the entire execution stage.

In a first example, replacement hardware 250 is capable of replacing at least partial functionality of a single stage. To illustrate, replacement hardware 250 may include a redundant decoder. As a result, if a decoder in decode stages 210a, 210b is defective, the redundant decoder may be utilized instead. Here, an instruction is fetched in stage 205b. And, instead of being decoded by the decoder in decode unit 210a, the instruction is decoded by replacement hardware 250 and passed to mapping stage 215.

Furthermore, in other embodiments, replacement hardware 250 is capable of replacing multiple stages of pipelines A and B. As stated above, replacement hardware 250 may include redundant hardware, spare hardware, general hardware, and/or reprogrammable hardware. Therefore, utilizing any combination of the above, hardware 250 is capable of performing the task of multiple stages, or portions thereof. As an illustrative example, hardware 250 is able to decode simple and/or complex instructions and perform simple arithmetic operations. As a result, if a decoder in decode unit 210a of pipeline A is defective and an ALU in execution unit 225b in pipeline B is defective, then replacement hardware 250 replaces the functionality of each—performs the decode task for the defective decoder in pipeline A and performs the execution task for the defective ALU in pipeline B.

Although replacement hardware, as illustrated and discussed above, is associated with multiple core pipelines; in an alternative embodiment, smaller, distributed modules of hardware 250 may be associated with individual core pipelines, such that replacement hardware for one core is not able to replace functionality of another core's pipeline. In other words, replacement hardware 250 is replicated on a per core basis, instead of centralized for multiple cores as illustrated in FIG. 2. In some implementations, replacement hardware 250 may be able to replace at least portions of each pipeline stage, or entire pipeline stages. Here, replacement hardware 250 may include programmable logic, or even a replacement core, which is dedicated for replacement of defective, faulty logic in multiple other core pipelines.

Illustrative examples of hardware that may be included in replacement hardware 250 includes a microcontroller, a Programmable Array Logic (PAL) device, a Field-Programmable Gate Array (FPGA) device, a replacement processor core, general hardware, and redundant hardware associated with any of pipeline stages 205-230. In one embodiment, where an FPGA is utilized, the FPGA may be one-time programmable or dynamically reprogrammable to provide dynamic replacement of multiple stages. For example, an FPGA may be programmed to replace the functionality of a defective decoder in decode unit 210a; it may be subsequently re-programmed to replace scheduler logic in schedule stage 220b.

Figure 3:
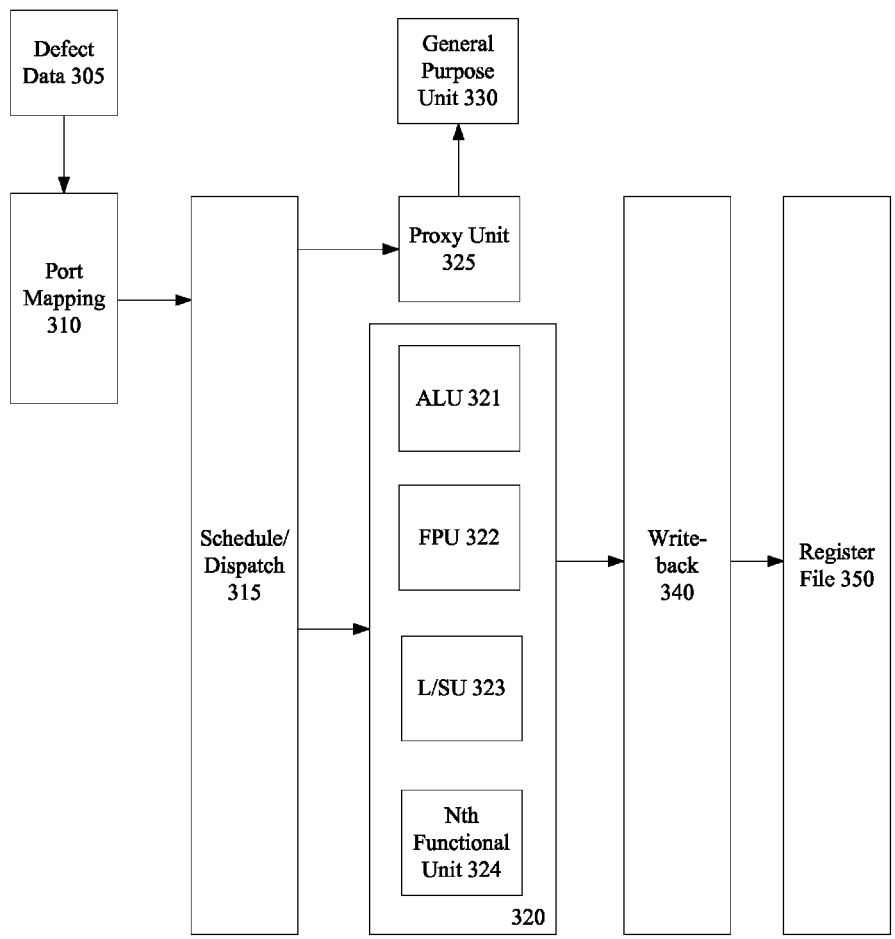
FIG. 3 illustrates an embodiment of a processor including a proxy unit and general purpose unit for replacing a defective execution unit.

Turning to FIG. 3, an embodiment of a processor including general purpose hardware to replace defective execution units is illustrated. Similar to the stages of FIG. 2, processor 300 includes an excerpt of stages including mapping unit 310, schedule and dispatch unit(s) 315, execution unit(s) 320, write-back mechanisms 340, and register file 350. During normal, non-defective execution, an operation is mapped to a corresponding port in unit 310, scheduled/dispatched in unit(s) 315, and executed on the corresponding port/execution unit in execution stage 320. As examples execution unit(s) include an Arithmetic Logical Unit (ALU), a Floating Point Unit (FPU), a load/store unit (L/SU), and other known functional units. Similarly, corresponding instruction/operations include an arithmetic operation, an integer operation, a floating-point operation, a load operation, a store operation, and other known processor instruction, operations, or micro-operations.

However, in one embodiment, when an execution unit is determined to be defective, proxy unit 325 and general purpose unit 330 are to replace the execution unit. Any known method of determining if a component or functional unit is defective may be utilized. As a first example, during manufacture a unit(s) is determined to be defective, such as during a test phase of manufacturing. As another example, a unit(s) is determined to be defective during operation. Here, a defect or failure may include a number of failures during a single period of operation, a number of cumulative failures, a single or number of failures to execute an instruction/operation, or detecting that the unit has stopped functioning at all during any period. As a result, any known method of determining if a unit(s) is defective or failing may be utilized.

As illustrated, defect data 305—any indication or representation that a component or unit is defective—is provided to port mapping logic 310. Therefore, port mapping unit 310 is capable of making the decision of which port to associate an operation with based on the defect data. For example, if ALU 321 is determined to be defective, then port mapping 310, in this example, maps an arithmetic or logical operation to proxy unit 325 instead of defective ALU 321. In other words, in response to a failure of an execution/functional unit, such as ALU 321, mapping logic 310 is to map an operation to proxy unit 325, which normally would be associated with ALU 321.

In response to proxy unit 325 receiving the operation, it provides the operation to general purpose unit/logic 330 to execute the operation. Note that general purpose unit 330 may include any of the aforementioned replacement hardware unit(s)/logic. As a result, the general purpose unit 330 is able to execute the operation instead of ALU 321. Here, general purpose unit 330, in one embodiment, may not include the optimal logic to execute the arithmetic operation; yet, the operation is able to performed. As an illustrative example, an FPGA programmed to handle the arithmetic operation is not able to perform the arithmetic operation as fast or efficiently as tailored execution unit. But, by providing general hardware, a wider range of units are replaceable with less logic and smaller cost. And, even if some performance is sacrificed by the replacement hardware, the performance gain of the replacement hardware is still potentially advantageous over a non-functioning or defective unit. In the spirit of this lower cost, smaller replacement unit, in one embodiment, an FPGA is dynamically reconfigurable as described above. As a result, if an arithmetic operation is mapped to proxy unit 325 and provided to general purpose unit 330, then the FPGA is programmed to execute the arithmetic instruction. Subsequently, if a load operation is mapped to proxy unit 325 and provided to general purpose unit 330, then the FPGA is programmed to execute the load operation.

As described immediately above, general purpose unit 330 may be capable of replacing multiple execution units; either through reprogramming general purpose hardware or providing general hardware that is capable of performing multiple types of execution. For example, general purpose unit 330 may be capable of executing an integer instruction as a replacement for ALU 321 and a floating point instruction as a replacement for the FP execution unit 322, as well as any other known execution unit.

As stated above in reference to mapping stage 310 and write-back mechanisms 340, some instructions are fixed latency instructions; they take a certain number of cycles to execute. However, some instructions aren't fixed latency and allow for write-back scheduling at completion. Therefore, in one embodiment, proxy unit 325, in conjunction with write-back mechanisms 340, are capable of scheduling write-back of execution results from general purpose unit 330 to register file 350 upon completion of execution. In other words, proxy unit 325 is able to utilize the same on-demand, write-back scheduling as a non-fixed latency instruction previously utilized. Consequently, if an operation is not optimally executed on general purpose unit 330, the reservation of write-back isn't performed until the completion of execution, which allows the general purpose hardware enough flexibility of performing the operation without unreasonable temporal constraints.

To illustrate, assume an instruction is fetched and decoded, resulting in an integer divide operation. However, defect data 305 indicates that Nth functional unit 324—in this example an integer divider functional unit—is faulty. As a result, mapping logic 310 maps the integer divide operation to proxy unit port 325. The operation is then scheduled, and when ready, dispatched by logic 315 to port 325. In response to receiving the operation, proxy unit 325 sends the operation to general purpose unit 330. The general purpose unit 330 completes the divide operation and send the result back to proxy unit 325. In response to the result, proxy unit 325 schedules/reserves a slot on write-back bus 340 for the result. When the allotted slot becomes available, the result is written back to register file 350 on the write-back bus. Although this example is illustrative and specific, it may be extrapolated to describe an embodiment of replacement execution by general purpose unit 330 for any known functional unit or core-execution component.

Figure 4A:
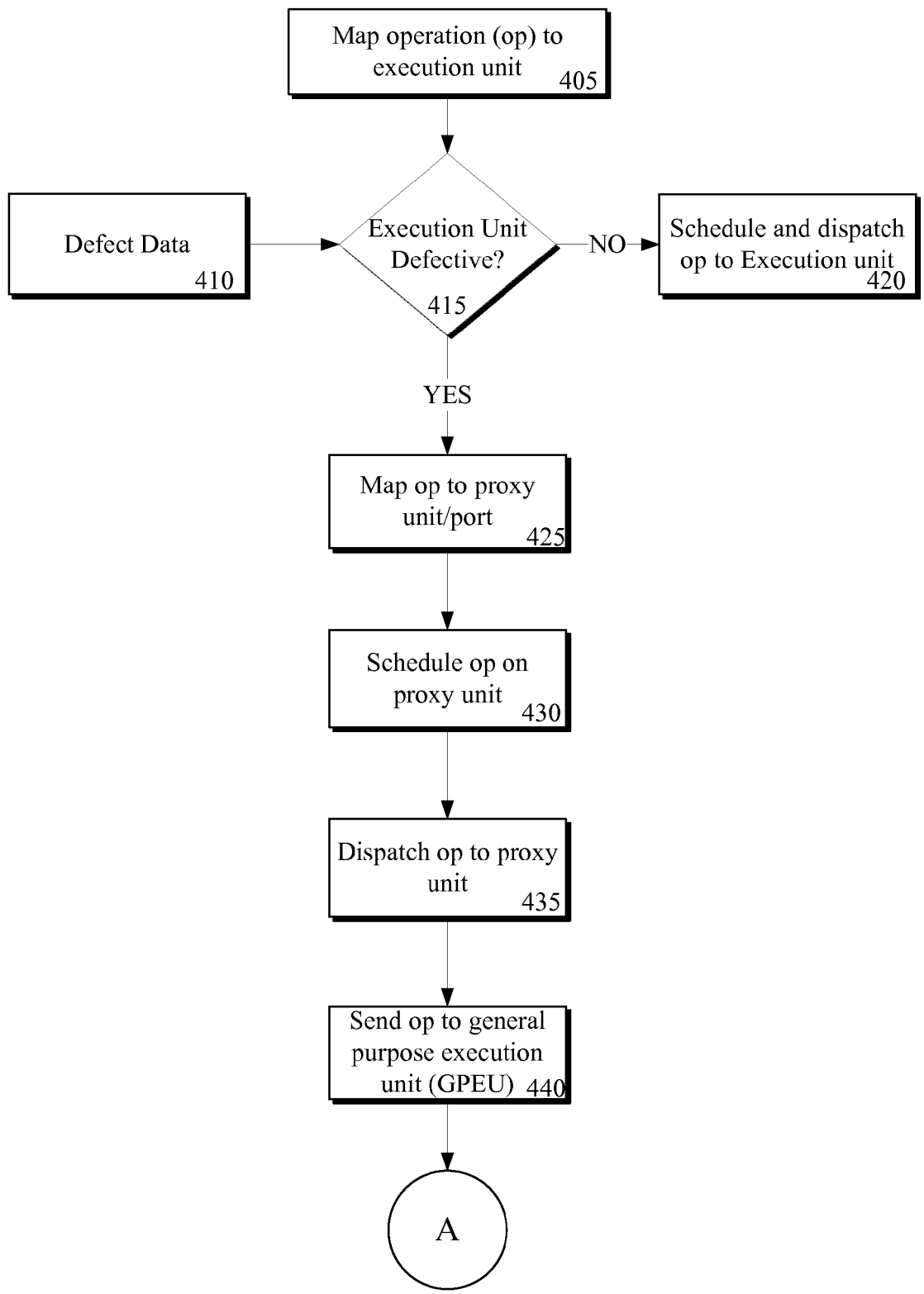
FIG. 4a illustrates an embodiment of a flow diagram for a method of executing an operation using general purpose hardware instead of a defective execution unit.
Figure 4B:
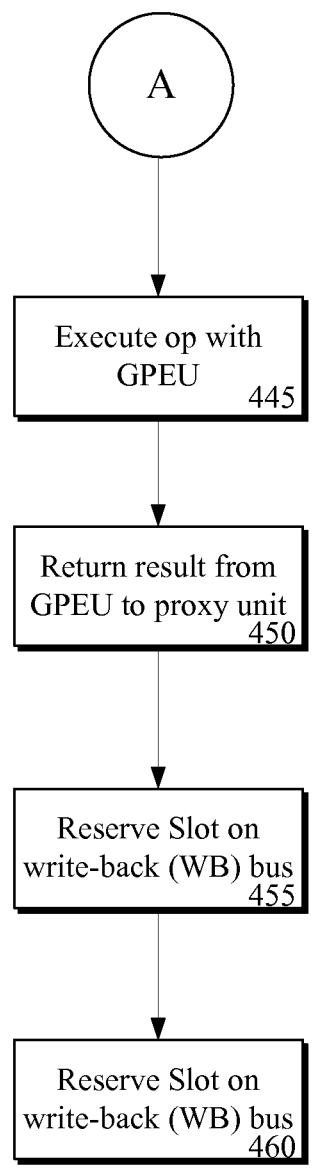

FIGS. 4a and 4b illustrate an embodiment of a flow diagram for a method of execution an operation utilizing replacement, general-purpose hardware instead of a defective execution unit. Note that the flows in FIGS. 4a and 4b are depicted as substantially serial; however, the illustrated flows may take place in any order, as well as potentially in parallel. For example, reservation of a slot on the write-back bus in flow 455 is illustrated after the return of the result from the General Purpose Execution Unit (GPEU). Yet, if the execution of an operation on the GPEU is known to be a fixed latency, then the reservation may, instead, occur at the time of map, schedule flows 425, 430.

Furthermore, not all of the flows included are required to be performed, while other known processor functions that are not illustrated may be additionally included. For example, flow 405 includes mapping the operation to an execution unit, and then essentially re-mapping in flow 425 if the execution unit is defective. However, in one embodiment, the actual initial mapping may not take place. For example, instead of actually performing the mapping to the execution unit, map logic may determine that an operation corresponds with a defective execution unit. As a result, the mapping logic may initially map the operation to a proxy unit based on the determination without actual, normal mapping to the faulty execution unit occurring.

However, in the embodiment illustrated, an operation, which may include an instruction, single operation, or micro-operation, is mapped to a corresponding execution unit in flow 405. In flow 415, it is determined if the execution unit is defective based on defect data 410. As stated above, any known apparatus and/or method may be utilized to determine if a component, functional unit, or execution unit is defective. As an example, the functional unit is tested during manufacture to determine if a defect occurred in the unit during the manufacturing process. In contrast, failure of a unit may be determined at runtime due to a number of failures associated with the execution unit, such as a number of times one or more operation is not able to complete on the execution unit. Here, any method of indication, such as a flag, bit, hardware, or input may be utilized to indicate to the mapping unit that an execution unit is defective.

If the unit is not defective, then the normal pipeline procedure—scheduling the operation on a port that corresponds with the normal functional unit, executing the operation with the functional unit, and writing the result back to a register file—is performed in flow 420. However, if the execution unit is defective, then the operation is mapped to a proxy unit/port in flow 425. Mapping of an instruction/operation to a port or execution unit is not described herein in detail to avoid unnecessary discussion. However, any known method, such as associating the operation with the execution unit in a hardware structure may be utilized for mapping.

Once mapped, the operation is scheduled on the proxy port associated with a general purpose execution unit (GPEU) in flow 430 and dispatched to the proxy port in flow 435. Similar to the operation of mapping, schedule and dispatch is not discussed in detail to avoid extraneous discussion. Therefore, moving to flow 440, when the operation is received by the proxy unit, it sends the operation to GPEU in flow 440.

Turning to FIG. 4b, the GPEU then executes the operation in flow 445. Essentially, in response to the normal execution unit being determined defective in flow 425, the operation being mapped to the proxy port in flow 425, and the proxy port sending the operation to the GPEU, the operation is executed on the GPEU. A few of the examples described above include the GPEU executing an operation, such as an arithmetic operation that corresponds with an Arithmetic Logic Unit (ALU), a logical operation that corresponds with an ALU, and a floating point operation that corresponds with a floating point unit. However, any known processor instruction/operation such as a pack, unpack, shift, multiply, divide, or other known instruction, to be executed on a group of logic, may be executed on a GPEU instead of the group of logic. Essentially, the GPEU replaces the defective functional unit—group of logic—and allows the processor to continue normal operation with a defective execution component.

After execution, the result is returned from the GPEU to the proxy unit in flow 450. The proxy unit, in response to receiving the result, reserves a slot on a write-back bus that couples the execution units to a register file in flow 455. When the slot is available, the result is then written-back the register file. From a perspective outside the pipeline, the operation was fetched, executed, and written-back normally to the register file, allowing the system to move forward. However, in reality, the GPEU replaced the faulty execution unit and performed the execution.

Therefore, the methods and apparatus' described herein allow for seamless replacement of faulty core components with general purpose hardware. As a consequence, instead of throwing a part away, which may result in reduced profits, or scrapping a part upon failure of a component after a period of operation; inexpensive, general purpose hardware may be utilized to replace components and allow the part to be sold or continue functioning. Furthermore, the replacement hardware may be utilized to implement specialized, additional functions, such as cryptography functions; lock synchronization or management functions; and/or implementation of specialize, non-ISA instructions.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising, a processor including:
a cache memory;
a plurality of processor core pipelines, wherein each of the plurality of processor core pipelines is to include a plurality of pipeline stages; and
replacement hardware coupled to at least a number of pipeline stages, of the plurality of pipeline stages, in at least two of the plurality of processor core pipelines, the replacement hardware to be capable of replacing a functionality of each of the number of pipeline stages in the at least two of the plurality of processor core pipelines, wherein only a first portion of the replacement hardware is to replace a functionality of only a first portion of the number of pipeline stages in a first processor core pipeline of the plurality of processor core pipelines in response to a failure of the first portion of the number of pipeline stages in the first processor core pipeline without replacing a functionality of a second portion of the number of pipeline stages in the first processor core pipeline, and wherein only a second portion of the replacement hardware is to replace a functionality of only a portion of the number of pipeline stages in a second processor core pipeline of the plurality of processor core pipelines.

2. The apparatus of claim 1, wherein the cache memory includes a shared cache memory to be shared by each of the plurality of processor core pipelines, and wherein the number of the plurality of pipeline stages is greater than one.

3. The apparatus of claim 1, wherein the replacement hardware includes hardware selected from a group consisting of a Programmable Array Logic (PAL) device, a Field-Programmable Gate Array (FPGA) device, and redundant hardware associated with the plurality of pipeline stages.

4. The apparatus of claim 1, wherein the replacement hardware comprises a Field-Programmable Gate Array (FPGA) device, and wherein the FPGA is dynamically re-programmable.

5. The apparatus of claim 1, wherein the number of pipeline stages in the at least two of the plurality of processor core pipelines comprises fetch logic to fetch instructions, decode logic to decode the instructions, and execution logic to execute the instructions.

6. The apparatus of claim 5, wherein the replacement hardware comprises:
replacement hardware, in response to a failure associated with fetch logic in a first processor core pipeline to perform fetch of an instruction for the first processor core pipeline;
replacement hardware, in response to a failure associated with decode logic in a second processor core pipeline to decode an instruction for the second processor core pipeline; and
replacement hardware, in response to a failure associated with execution logic in a third processor core pipeline to execute an instruction for the third processor core pipeline.

7. The apparatus of claim 5, wherein the plurality of pipeline stages further comprises mapping logic to map the instruction to the execution logic; and dispatch logic to dispatch the instruction to the execution logic.

8. An apparatus comprising a processor, the processor including:
a plurality of execution units of a core;
a proxy unit;
mapping logic coupled to the plurality of execution units and the proxy unit, the mapping logic to map an instruction to be associated with an execution unit of the plurality of execution units of the core to the proxy unit in response to a failure associated with the execution unit; and
programmable general purpose execution logic capable of being programmed to implement functionality of the execution unit to execute the instruction in response to receiving the instruction from the proxy unit responsive to the mapping logic mapping the instruction to the proxy unit, wherein the programmable general purpose execution logic is not used to replace one or more non-failed execution units of the plurality of execution units of the core, and wherein the programmable general purpose execution logic is capable of being programmed to implement functionalities of different types of execution units.

9. The apparatus of claim 8, wherein each of the plurality of execution units is to be individually selected from a group consisting of an integer execution unit, a floating point execution unit, a jump execution unit, a load execution unit, a store execution unit, a logical execution unit, an arithmetic execution unit, and an execution unit to execute an instruction that is part of an Instruction Set Architecture (ISA) associated with the processor.

10. The apparatus of claim 8, wherein the failure associated with the execution unit comprises the failure of the execution unit to execute the instruction on a previous attempt.

11. The apparatus of claim 8, wherein the general purpose execution logic is capable of executing instructions as a replacement for a number of execution units of the plurality of execution units, the number of execution units being greater than one.

12. The apparatus of claim 11, wherein the plurality of execution units include at least an Arithmetic Logic Unit (ALU) and a Floating Point (FP) execution unit, and wherein the general purpose execution logic is capable of executing instructions as a replacement for a number of execution units of the plurality of execution units comprises the general purpose execution logic being capable of executing an integer instruction as a replacement for the ALU and a floating point instruction as a replacement for the FP execution unit.

13. The apparatus of claim 11, wherein the processor further includes:
a write-back bus coupled to the execution units and general purpose execution logic;
a storage structure coupled to the execution units through the write-back bus; and
reservation logic coupled to the write-back bus to reserve a slot on the write-back bus for a result from the general purpose execution logic executing the instruction in response receiving the instruction from the proxy unit responsive to the mapping logic mapping the instruction to the proxy unit.

14. The apparatus of claim 11, wherein the processor further includes a schedule and dispatch unit to schedule the instruction on and dispatch the instruction to the proxy unit responsive to the mapping logic mapping the instruction to the proxy unit.

15. A method comprising:
determining if a functional unit in a processor is defective;
scheduling an operation on a port that corresponds with the functional unit and executing the operation with the functional unit in response to determining the functional unit is not defective;
mapping the operation to a proxy port associated with a general purpose execution unit in response to determining the functional unit is defective; wherein the functional unit is only a portion of processor pipeline and another portion of the processor pipeline is still used to process the operation after the mapping of the operation to the general purpose execution unit, and wherein the general purpose execution unit is more general purpose than the functional unit;
scheduling the operation on the proxy port associated with the general purpose unit in response to mapping the operation to the proxy port;
dispatching the operation to the proxy port in response to scheduling the operation on the proxy port;
sending the operation to the general purpose execution unit responsive to receiving the operation at the proxy port in response to dispatching the operation to the proxy port; and
executing the operation with the general purpose execution unit responsive to mapping the operation to the proxy port in response to determining the functional unit is defective.

16. The method of claim 15, further comprising:
determining if a second functional unit in the processor is defective;
scheduling a second operation on a second port that corresponds with the second functional unit and executing the second operation with the second functional unit in response to determining the second functional unit is not defective;
mapping the second operation to the proxy port associated with the general purpose execution unit in response to determining the second functional unit is defective; and
executing the second operation with the general purpose execution unit responsive to mapping the second operation to the proxy port in response to determining the second functional unit is defective.

17. The method of claim 16, wherein the first operation that corresponds with the first functional unit and the second operation that corresponds with the second functional unit are separately and orthogonally selected from a group consisting of an arithmetic operation that corresponds with an Arithmetic Logic Unit (ALU), a logical operation that corresponds with an ALU, and a floating point operation that corresponds with a floating point unit.

18. The method of claim 16, further comprising:
reserving a slot on a write-back bus coupled to the general purpose execution unit in response to mapping the operation to the proxy port; and
writing-back a result of executing the operation with the general purpose
execution unit to a storage structure during the slot reserved on the write-back bus in response to executing the operation with the general purpose execution unit.

19. A system comprising:
a Dynamic Random Access Memory (DRAM) to store an instruction; and
a processor coupled to the memory through an interconnect, the processor including a fetch unit to fetch the instruction, a decode unit to decode the instruction into a plurality of operations, a mapping unit to associate at least an operation of the plurality of operations with a programmable general purpose unit of the processor, instead of an execution unit of the processor of a plurality of execution units of the processor, in response to the execution unit of the processor being defective, wherein the programmable general purpose unit of the processor is to be programmed to have a functionality of execute the operation and is to execute the operation instead of the execution unit of the processor in response to the mapping unit associating the operation with the programmable general purpose unit of the processor instead of the execution unit of the processor, wherein the programmable general purpose unit of the processor is less efficient at performing the operation than the execution unit of the processor, wherein the programmable general purpose unit of the processor is capable of executing operations for at least two of the plurality of execution units of the processor.

20. The system of claim 19, wherein the mapping unit is to map the operation to a proxy port, instead of a port for the execution unit, in response to the execution unit being defective; and wherein the proxy port to provide the operation to the programmable general purpose unit in response to the mapping unit mapping the operation to the proxy port.

21. The system of claim 20, wherein the programmable general purpose unit comprises hardware selected from a group consisting of a Programmable Array Logic (PAL) device, and a Field-Programmable Gate Array (FPGA) device.

* * * * *